United States Patent [19]
Dietterich et al.

[11] Patent Number: 5,413,472
[45] Date of Patent: May 9, 1995

[54] MOLDING APPARATUS

[75] Inventors: Charles W. Dietterich, Broadheadsville, Pa.; Richard A. Tarozzi, Gales Ferry, Conn.

[73] Assignee: Binney & Smith, Inc., Easton, Pa.

[21] Appl. No.: 970,617

[22] Filed: Nov. 3, 1992

[51] Int. Cl.6 .......................................... B29C 33/00
[52] U.S. Cl. ................................... 425/183; 425/188; 425/193; 425/195; 425/408; 425/411; 425/DIG. 57; 249/102; 249/170
[58] Field of Search .............. 249/102, 103, 104, 105, 249/139, 170; 425/DIG. 57, DIG. 244, DIG. 249, 183, 193, 195, 233, 235, 318, 395, 408, 411, 188

[56] References Cited

U.S. PATENT DOCUMENTS

| | | | |
|---|---|---|---|
| D. 211,608 | 7/1968 | Gray | D55/1 |
| 1,224,687 | 5/1917 | Taliaferro | 164/376 |
| 1,698,836 | 1/1929 | Bartley et al. | 249/170 |
| 1,932,298 | 10/1933 | Van Emden | 425/DIG. 249 |
| 2,954,597 | 10/1960 | McFarland et al. | 25/118 |
| 3,257,484 | 6/1966 | Barnette | 249/170 |
| 3,325,861 | 6/1967 | Pincus et al. | 249/170 |
| 3,380,121 | 4/1968 | Chittenden et al. | 249/104 |
| 3,536,290 | 10/1970 | Terry | 249/104 |
| 3,552,711 | 1/1971 | Delaney | 249/170 |
| 3,741,706 | 6/1973 | Conley et al. | 425/406 |
| 4,344,529 | 8/1982 | Ibarzabal | 249/170 X |
| 4,440,377 | 4/1984 | Hujik | 249/119 |
| 4,569,815 | 2/1986 | Rentz et al. | 264/323 |

FOREIGN PATENT DOCUMENTS

| | | |
|---|---|---|
| 709562 | 1/1965 | Canada ........ 425/DIG. 57 |
| 0061715 | 3/1982 | European Pat. Off. . |
| 549394 | 4/1932 | Germany . |
| 2009104 | 9/1970 | Germany . |
| 3204052 | 8/1983 | Germany . |

OTHER PUBLICATIONS

Tyco Industries, Inc., Photocopies of top and bottom of box for Super Dough "Mickey's Farm" Toy Set; copyright 1990.
Tyco Industries, Inc., Directions from Super Dough "Mickey's Farm" Toy Set; Copyright 1990.
Four photographs of pig mold from Super Mold "Mickey's Farm" by Tyco Industries, Inc; copyright 1991.
Kenner Photocopies of top and bottom of box for Play Doh "Bright Starters Farm Set", copyright 1989.
Kenner, Directions from Play Doh "Bright Starters Farm Set", copyright 1989.
Three photographs of cow mold from Play-Doh "Bright Starters Farm Set" by Kenner; Copyright 1982.

*Primary Examiner*—James C. Housel
*Assistant Examiner*—Harold Y. Pyon
*Attorney, Agent, or Firm*—Leydig, Voit & Mayer, Ltd.

[57] ABSTRACT

A molding device to make molded items from molding compound is provided. The device includes a first mold insert which corresponds to a first portion of a molded item and a first mold insert holder removably holds the first mold insert. A second mold insert is provided which corresponds to a second portion of the molded item and a second mold insert holder is provided which removably holds the second mold insert. The first and second insert holders are connected at one end by a living hinge and a handle extends from the opposite of the first and second holders. In a preferred embodiment, a twist lock is provided for securing the inserts to the insert holders.

27 Claims, 3 Drawing Sheets

MOLDING APPARATUS

FIELD OF INVENTION

The present invention is directed toward a molding device and more particularly toward a molding device which utilizes a molding compound.

BACKGROUND OF THE INVENTION

Molding devices which utilize molding compound or modeling compound are old in the art and generally comprise a cavity having a shape of one half the desired object. The cavity is first filled with molding compound and the compound is thereafter removed. These molds have a generally planar shape with the open side of the cavity forming a generally planar surface. Thus, the opposite side of the molded object is usually flat. However, the opposite side could be the shape of the molding compound which extends outward from the planar surface, or the shape of the molding compound which projects inward from the planar surface. Consequently, these molding devices produce three dimensional representations which do not have the other half of the object.

More recently molding devices have been provided which have two mold portions. Each mold portion has a cavity and the cavities are each filled with molding compound. The mold portions are positioned adjacent to each other to form a three dimensional figure.

Such prior art molding devices, however, are beset with one or more of following shortcomings. A molding device is required for each particular object to be molded. The mold devices are bulky and expensive. Only a limited number of molding devices will fit into a package due to space limitations. The molding device as sold is limited to making specific objects that may be quickly outdated. High investment costs are necessary to make the large specific molding devices. The molding device is hard for a small child to hold. Finally, the molding device is difficult for a small child to squeeze. The present invention is directed toward overcoming one or more of the problems discussed above.

OBJECTS OF THE INVENTION

It is an object of the invention to make a molding device which is compact and inexpensive to manufacture.

It is a further object of the invention to provide a molding device which can accommodate several molds in a limited size package.

It is yet another object of the invention to provide a molding device which can be updated at a low cost.

It is a further object of the invention to provide a molding device in which the investment cost for equipment to produce the device is minimized.

It is yet another object of the invention to provide a molding device that is easy for a small child to hold.

Yet another object of the invention is to provide a molding device which may be easily squeezed by a small child.

BRIEF SUMMARY OF THE INVENTION

In one aspect of the present invention, a molding device for making molds for modeling compound is provided. The device comprises a first mold insert, a first mold insert holder for holding the first mold insert, a second mold insert, and a second mold insert holder for holding the second mold insert. In a preferred embodiment of this invention, the molding device has a hinge to operatively connect the first and second holders. In yet another preferred embodiment of this aspect of the invention, the holders include hooks which cooperate with flanges on the inserts forming a twist lock to secure and align the inserts to the holders.

In another preferred embodiment of this invention, the holders have handles which are used to squeeze the holders together. In a further preferred embodiment of this invention, the handles include an alignment feature for aligning the handles to each other.

In accomplishing these and other objects of the invention, these and other features and advantages of the invention will be more readily apparent upon reading the following description of the invention and upon reference to the accompanying drawings wherein:

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figures 1, 2:
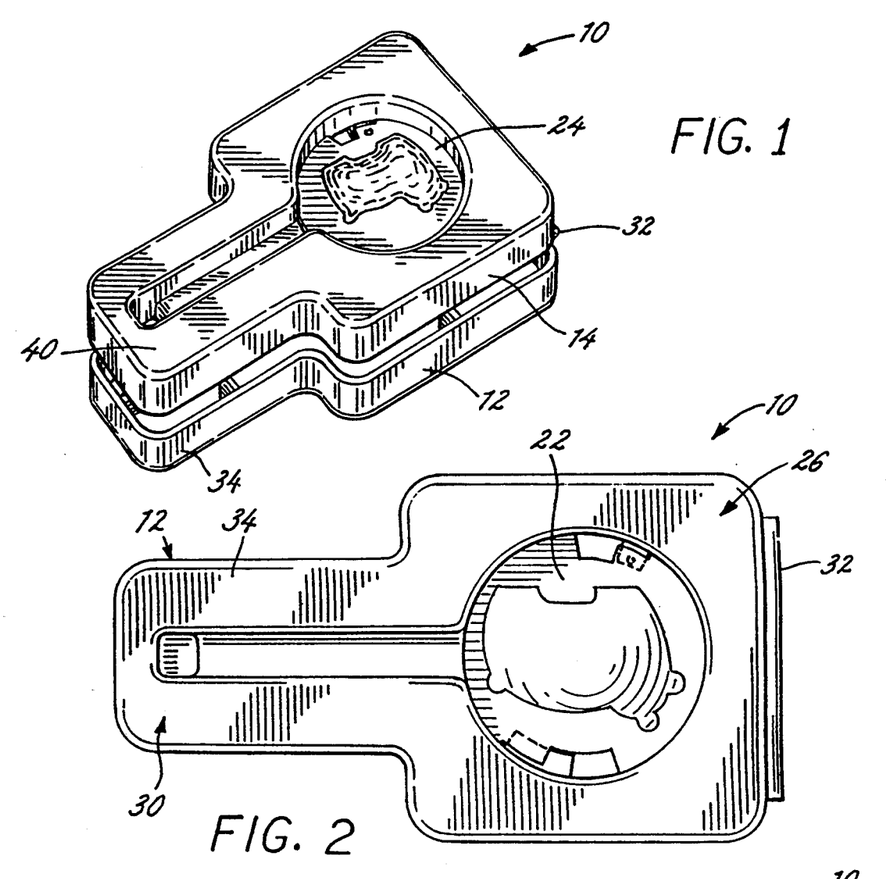
FIG. 1 is a perspective view of the present invention in the closed position.
FIG. 2 is a top plan view of the present invention.

Referring to FIG. 1, a molding device is indicated generally by the reference numeral 10. The molding device 10 includes first mold insert holding means 12 and second mold insert holding means 14. The first and second mold insert holding means 12 and 14 may take any suitable form, but preferably the holding means 12 and 14 take the form of first and second holders 12 and 14. The first and second holding means 12, 14 hold the first and second mold inserts 22 and 24, respectively.

Referring to FIG. 2, the first mold insert holder 12 may have any suitable shape in which to hold the first mold insert 22, but preferably the first holding means 12 comprises a first end 26 and a second end 30. While the first mold insert 22 may be placed on the first mold insert holder 12 in any suitable location, the first insert 22 is centrally located on the first end 26 in order to provide for the largest possible first insert 22 to be fitted into the first mold holder 12.

In order to further provide for the largest possible molded item for the molding device 10, the first end 26 of the first holder 12 is preferably only slightly larger than the first mold insert 22. The first end 26 may have a square shape as shown or any other suitable shape including circular. The first and second holders 12 and 14 may be constructed of any suitable material, but preferably to minimize cost are made of a durable plastic.

The first mold insert 22 may have a circular shape, as shown in FIG. 2, or any other suitable shape. The inserts 22 and 24 may be made of any suitable durable material, but preferably are constructed of a molded plastic.

To close the molding device 10, the first holder 12 and the second holder 14 are squeezed against each other with the first mold insert 22 aligning with the second mold insert 24 to form the molded item. While the practice of this invention includes physically aligning the first holder 12 and the second holder 14 together to form the molded item, preferably the first mold holder 12 and second mold holder 14 are joined by connection means 32 as shown in FIGS. 1, 2 and 3.

While any suitable connection means 32 may be used to join the first and second holders 12 and 14, preferably the connection means 32 takes the form of a hinge 32 which is aligned along an outside edge of the first and second holding means 12 and 14. Thus, the first and second holding means 12 and 14 may be opened about the hinge 32 exposing the first and second mold inserts 22 and 24 in order that molding compounds may be placed into the mold inserts 22 and 24. The hinge 32 also serves to align the first mold insert 22 to the second mold insert 24 in order to form a proper molded item when the first and second insert holders 12 and 14 are closed about the hinge 32. To minimize cost, the hinge 32 is a living hinge which is permanently attached to the first and second holders 12 and 14 forming a common piece of molded plastic including the first holder 12 the second holder 14, and the living hinge 32.

To assist in the closing of the first holder 12 against the second holder 14 in order to form a completed molded item, the molding device 10 has a first handle means 34. The first handle means 34 may be suitably positioned anywhere within the holding means 12, but preferably the handle means 34 is located on the second end 30 of the first holding means 12 and is preferably positioned opposite the connection means 32. The first mold insert 22 is thereby positioned between the hinge 32 and the first handle means 34. The first handle means 34 may take any suitable form but preferably take the form of an elongated handle.

Figure 3:
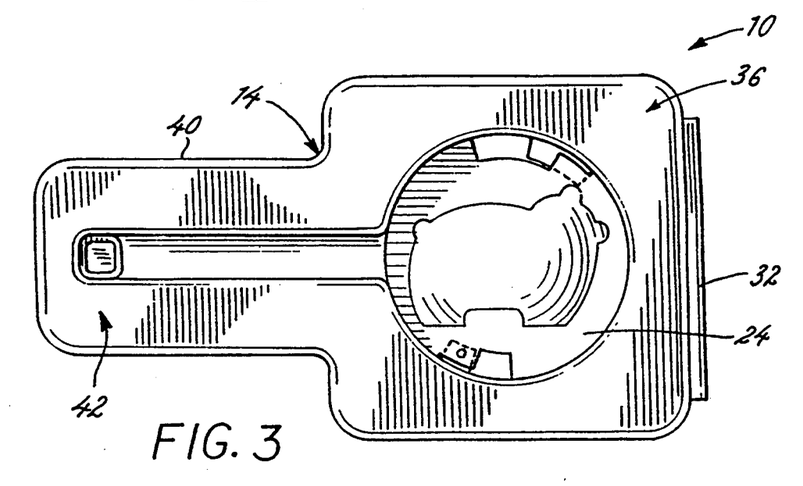
FIG. 3 is a bottom plan view of the present invention.

Referring to FIG. 3, the second mold insert holder 14 has a first end 36 to which the second mold insert 24 is located. Preferably, the second mold insert 24 is centrally located in and only slightly smaller than the first end 36 of the second holder 14. The first end 36 may have any suitable shape, but a square shape as shown in FIG. 3 is preferable in order to obtain sufficient strength and rigidity to support the second insert 24. The second mold insert 24 preferably has a circular shape as shown in FIG. 3, but may have any other suitable shape including a rectangle.

To assist in closing the second mold holder 14 against the first mold holder 12, the second mold holder 14 includes a second handle means 40. The second handle means 40 may be located in any suitable location within the second mold holder 14, but preferably it is located on a second end 42 of the second mold holding means 14. The second handle means 40 may take any suitable form, but preferably the second handle means 40 take the form of an elongated handle.

Again referring to FIG. 1, when the first holder 12 is closed against the second holder 14, the first handle 34 aligns with the second handle 40. The first and second handles 34 and 40 are preferably elongated and slender in order that a small child may reach its hands around the first and second handle means 34 and 40 in order to complete the forming of the molding item.

Figure 4:
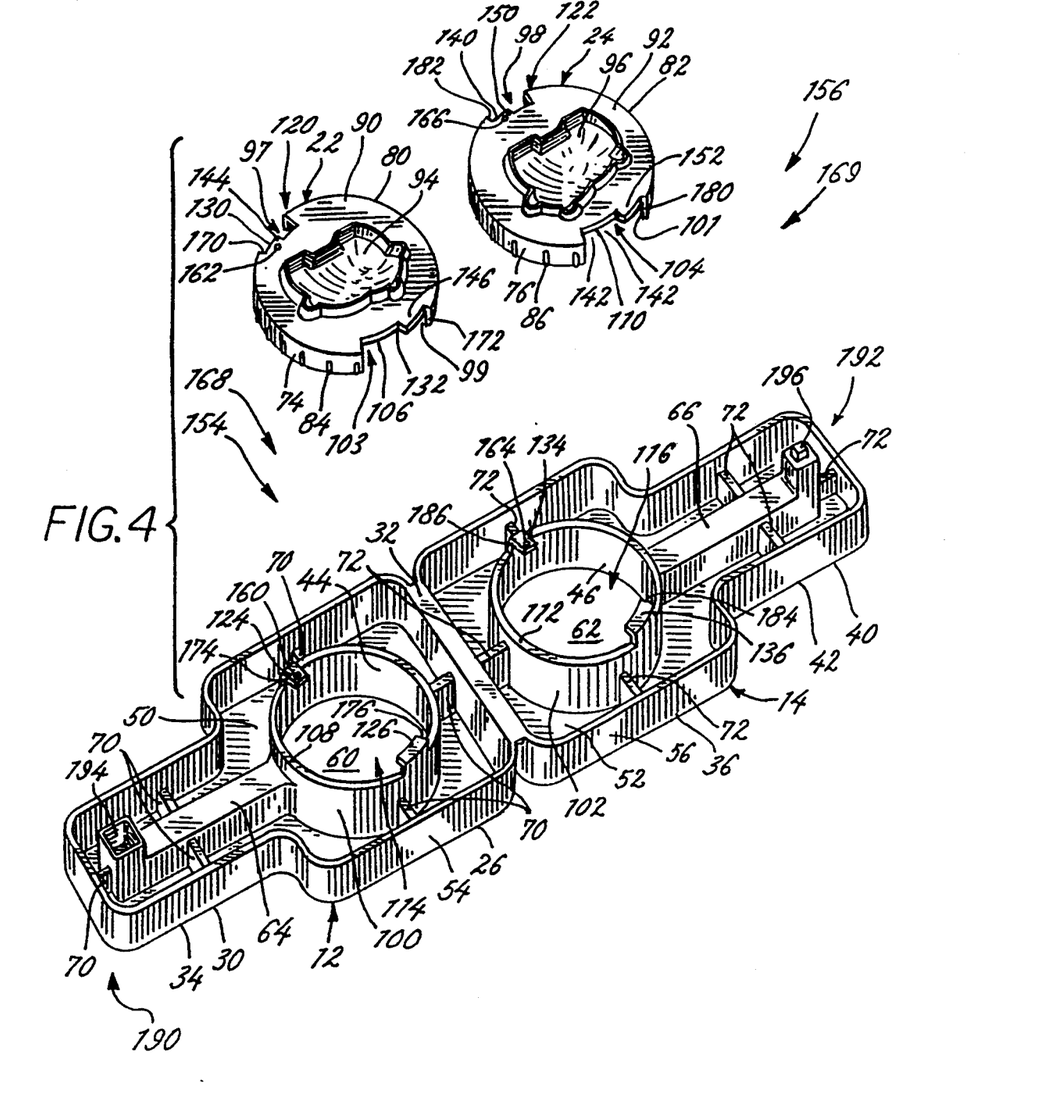
FIG. 4 is an exploded perspective view of a mold making device of the present invention in an open position.

Referring to FIG. 4, to receive the mold inserts 22 and 24, the first and second holder 12 and 14 have first and second mold receiving portions 44 and 46, respectively. The mold receiving portions 44 and 46 may have any suitable configuration, but preferably, take the form of first and second rings 44 and 46 in order to provide rigidity and strength to mold inserts 22 and 24 while minimizing the size and weight of the holders 12 and 14.

To provide sufficient rigidity to the holders 12 and 14, to form and distort the molding compound, the holders 12 and 14 have a configuration which maximizes strength while minimizing weight and size. While these criteria can be met with various designs which fall within the concept of this invention, preferably the first and second holders 12 and 14 include first and second planar bases 50 and 52, respectively. The first planar base 50 extends over the first and second ends 26 and 30 of the first holder 12. The second planar base 52 extends over the first and the second ends 36 and 42 of the second holder 14. The first and second planar base 50 and 52 are parallel to and spaced from the hinge 32. To provide rigidity to the planar bases 50 and 52, the planar bases 50 and 52 have first and second vertical walls 54 and 56 which extend upwardly and perpendicularly from the periphery of the first and second planar bases 50 and 52. The first and second rings 44 and 46 extend upwardly from the planar bases 50 and 52 with their respective axes perpendicular to the planar bases 50 and 52.

Preferably, to view the mold within mold holders 12 and 14, the first and second rings, 44 and 46 are aligned with openings 60 and 62 in the planar bases 50 and 52. The shape of the molded inserts 22 and 24 can be readily viewed through the first and second holders 12 and 14 without the user opening the mold holders 12, 14.

For sufficient rigidity between the rings 44 and 46 and the handles 34 and 40, first and second elongated U-shaped channels 64 and 66 extend upwardly from the first and second planar bases 50 and 52. The channels 64, 66 are centrally located within the first and second handles 34 and 40 and extend from the outside of the rings 44 and 46 to the point near the end of the handles 34 and 40.

In order to provide maximum strength and rigidity while minimizing the size, weight and expense of the molding device 10, reinforcing ribs 70 and 72 are preferably strategically placed within the first and second holding means 12 and 14. The ribs 70 and 72 may be placed in any suitable location but, preferably, extend perpendicularly to and upwardly from the first and second planar bases 50 and 52 and are placed between the rings 44 and 46 and the vertical walls 54 and 56. Additional ribs 70 and 72 extend from the channels 64 and 66 outwardly toward and adjoin the vertical wall 54 and 56.

Preferably, the first and second mold inserts 22 and 24 have generally circular planar shapes which conform generally to the rings 44 and 46. In order to obtain sufficient rigidity while minimizing weight, size, and cost, the first and second mold inserts, 22 and 24 have first and second collars 74 and 76, respectively. The collars 74, 76 extend downwardly and perpendicularly from first and second external insert peripheries 80 and 82 of the first and second inserts 22 and 24. To further increase the manipulation of the first and second mold inserts 22 and 24, the first and second collars 74 and 76 have first and second collar ribs 84 and 86 which are equally spaced, vertically elongated, and outwardly extended along the collars 74 and 76.

The mold inserts 22 and 24 have first and second molding faces 90 and 92, respectively. The first and second mold faces 90 and 92 have first and second cavities 94 and 96, respectively, which have the negative shape of one half of the molded object. As will be described below, the first and second cavities 94 and 96 are filled with molding compound and the first and second holders 12 and 14 are closed to form the mold.

The mold inserts 22 and 24 can have multiple mold cavities 94 and 96 in each mold insert 22, 24. In addition, the molding device may include several different pairs of mold inserts 22 and 24 which can be attached to the holders 12 and 14. The mold inserts 22 and 24 can have many different shapes including human figures, animals and food items. In addition, the mold inserts 22 and 24 can be sold as sets. For example, a set of mold inserts 22 and 24 can be based on a farm theme and can include a farm family, farm equipment and farm animals, such as cows, pigs, sheep, chickens, horses and goats. Another set of mold inserts 22 and 24 can be based on a zoo theme and can include elephants, lions, monkeys and giraffes. These sets can be sold separately or with the holders 12 and 14.

Figure 5:
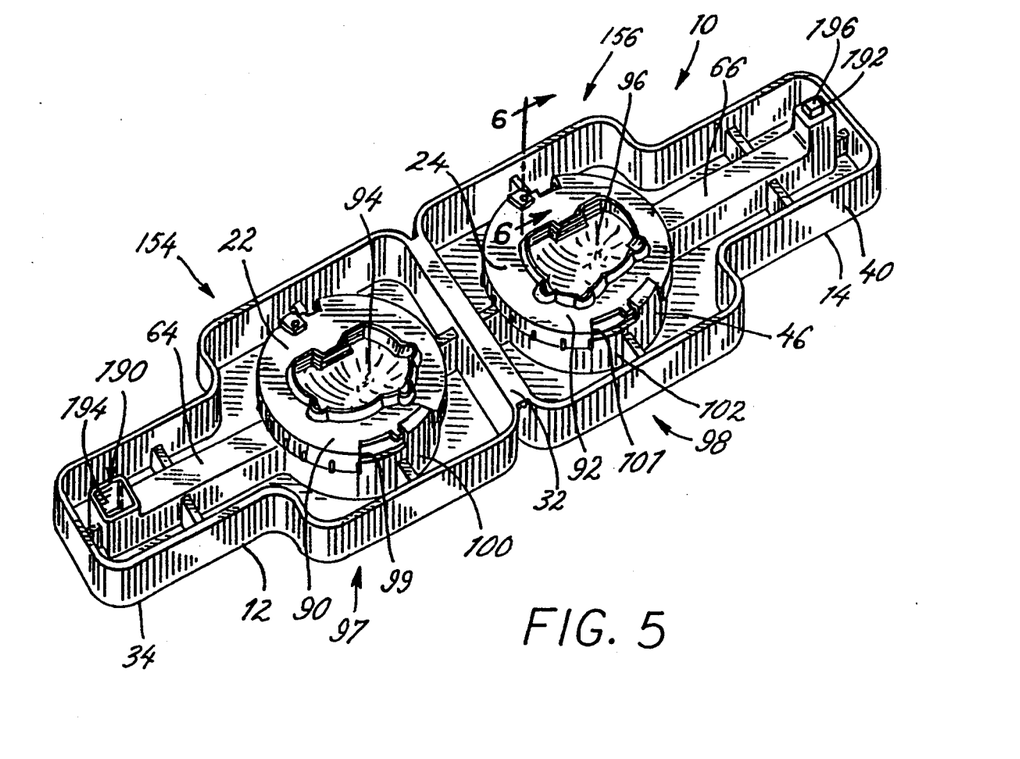
FIG. 5 is a perspective view of a mold making device of the present invention with the mold making device in an open position.

To properly attach and align the first and second inserts 22 and 24 onto the first and second holders 12 and 14, first and second centering means 97 and 98 are preferably provided. The first and second centering means 97 and 98 may take any suitable form to attach and align the inserts 22 and 24 to the holders 12 and 14. In this embodiment, the first centering means 97 comprises a first internal insert periphery 99 which may take the form of the interior surface of the first collar 74 of the first insert 22 and a first external holder periphery 100 which may preferably take the form of the first outside diameter of the of the first ring 44. As shown in FIG. 5, the first internal insert periphery 99 matingly fits over the first external holder periphery 100, thereby, properly attaching and aligning the first insert 22 over the first holder 12.

Similarly, although the second centering means 98 may take any suitable form, the second centering means 98 preferably comprises a second internal insert periphery 101 which takes the form of the interior surface of the second collar 76 of the second insert 24 and a second external holder periphery 102 which takes the form of the second outside diameter of the second ring 46. The second internal insert periphery 101 matingly slides over the second external holder periphery 102 thereby properly attaching and aligning the second mold insert 24 to the second holder 14.

Again, referring to FIG. 4, to properly align the heights of the first and second mold inserts 22 and 24, first and second depth alignment means 103 and 104 are preferably provided. While the first depth alignments means 103 may take any suitable form, preferably the first depth alignment means 103 comprises a first insert inner face 106 and a first holder ring inner face 108. The first insert inner face 106 seats against the first holder ring inner face 108 thereby controlling the depth of the first insert 24 relative to the first holder 12.

Similarly, although the second depth alignment means 104 may take any suitable form, the second depth alignment means 104 preferably comprises a second insert inner face 110 and a second holder ring inner face 112. The second mold inner face 110 seats against the second holder ring inner face 112 thereby controlling the depth of the second insert 24 with respect to the second holder 14.

To secure the first and second mold inserts 22 and 24 to the first and second holders 12 and 14, the first and second rings 44 and 46 have first and second holder securing means 114 and 116 and the first and second mold inserts 22 and 24 have first and second insert securing means 120 and 122. Although any suitable first holder securing means 114 may be used, preferably to prevent misassembly of the mold inserts 22 and 24, the first holder securing means 114 of the first holders 12 comprise a first narrow hook 124 which extends upwardly and inwardly from the first ring inner face 108 and a first wide hook 126 which is diametrically opposed to the first narrow hook 124 and extends upwardly and inwardly from the first ring inner face 108.

While any suitable first insert securing means 120 may fall within the scope of this invention, preferably the first insert securing means 120 comprise narrow and wide first openings 130 and 132. The openings 130, 132 are formed into the periphery of the first mold insert 22 and conform substantially to the shape of the first narrow and wide hooks 124 and 126. The first mold insert 22 may be assembled onto the ring 44 of the first holder 12 in only one radial orientation, i.e., with the first narrow and wide openings 130 and 132 aligned with the first narrow and wide hooks 124 and 126, respectively, thus preventing misassembly.

Similarly, although the second holder and insert securing means 116 and 122 may take any suitable form, preferably the second holder securing means 116 comprise second narrow and wide hooks 134 and 136 which extend upwardly and inwardly from the second ring inner face 112. The second insert securing means 122 preferably comprise second narrow and wide openings 140 and 142 which are formed into the periphery of the second mold insert 24 and are slid over the second narrow and wide hooks 134 and 136.

In order to adequately secure the first insert 22, the first insert securing means 120 further comprises narrow and wide first flanges 144 and 146 which extend outwardly from the first mold insert 22 adjacent the first and second openings 130 and 132 in a counter-clockwise direction. Similarly, the second insert securing means 122 further comprises narrow and wide second flanges 150 and 152 which extend outwardly from the second mold insert 24 in a counter-clockwise direction adjacent the second narrow and wide openings 140 and 142.

After the narrow and wide openings 130 and 132 are aligned with the first narrow and wide hooks 124 and 126 and the first insert inner face 106 seats against first ring inner face 108, the first mold insert 22 is rotated in a clockwise direction thereby securing the first mold insert 22 against the first holder 12. Similarly, by twisting the second mold insert 24 when the second insert inner face 110 is seated against the second ring inner face 112, the second mold insert 24 is rotated in a clockwise direction to secure it against the second holder 14.

The narrow and wide first flanges 144 and 146, interact with the first narrow and wide hooks 124 and 126 in order that the first insert securing means 120 and the first holder securing means 114 form a first twist lock 154. Specifically, as the first mold insert 22 is rotated clockwise the narrow and wide flanges 144, 146 are positioned beneath and overlapped by the first narrow and wide hooks 124, 126. Consequently, the first mold insert 22 cannot be moved upwardly since the flanges 144, 146 and hooks 124, 126 prevent upward movement. Similarly, the narrow and wide second flanges 150 and 152, respectively, interact with the second narrow and wide hooks 134 and 136, respectively, in order that the second insert securing means 122 and the second holder securing means 116 form a second twist lock 156.

Figure 6:
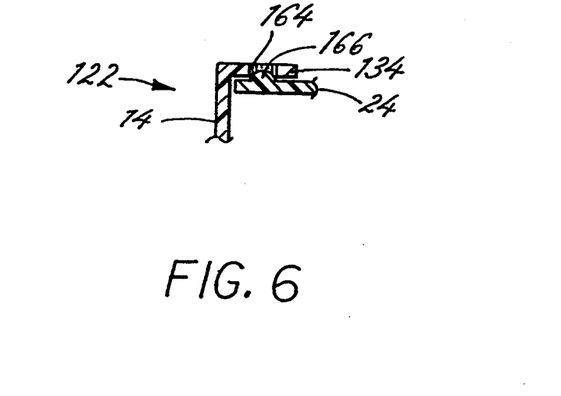
FIG. 6 is a partial cross sectional view taken along line 6—6 of FIG. 5.

Preferably, to better secure the first and second mold inserts 22 and 24 against the first and second holders, 12 and 14 the first insert securing means 120 further comprise a first holder detent or hole 160 located on the first narrow hook 124 and a first projection 162 located on the first narrow flange 144. The first projection 162 is matingly fit into the first holder detent or hole 160. Similarly, the second insert securing means 122 further comprises a second holder detent or hole 164 as shown in FIG. 6 located on the second narrow hook 134 and a second projection 166 located on the second narrow flange 150. The second projection 166 matingly fits into the second holder detent or hole 164.

Referring to FIG. 4, the molding device 10 preferably further comprises first and second angular alignment means 168 and 169 to form an accurate radial location of the first and second mold inserts 22 and 24 with respect to the first and second holders 12 and 14. While the first and second angular alignment means 168 and 169 can be of any suitable form, preferably the first angular alignment means 168 comprise first narrow and wide insert radial stops 170 and 172 which adjoin the first narrow and wide openings 130 and 132 and first narrow and wide holder radial stops 174 and 176 which are formed from the ends of the first narrow and wide hooks 124 and 126. The first narrow and wide insert stops 170 and 172 contact the first narrow and wide holder stops 174 and 176 to positively radially locate the first insert 22 in the first holder 12.

Similarly, the second angular alignment means preferably comprise second narrow and wide insert radial stops 180 and 182 which adjoin the second narrow and wide openings 140 and 142 and second insert narrow and wide holder radial stops 184 and 186 which are located on the ends of the narrow and wide second hooks 134 and 136. The second narrow and wide insert stops 180 and 182 abut the second narrow and wide holder stops 184 and 186 positively radially locating the same.

In order to properly align the first and second mold inserts 22 and 24 when the first and second holders 12 and 14 are closed, the first and second rings 44 and 46 are spaced an equal distance from the hinge 32. Furthermore, the narrow and wide holder stops 174 and 176 of the first holder 12 are so aligned with the hinge 32 and the first narrow and wide insert stops 170 and 172 are so aligned with the first cavity 94, that the first cavity 94 is always presented in a predetermined orientation. Similarly, the second narrow and wide holder stops 184 and 186 are so oriented relative to the hinge 32 and the second narrow and wide insert stops 180 and 182 of the second mold insert 24 are so oriented angularly with the second cavity 96 that the second cavity 96 has a predetermined orientation. The first cavity 94 is thus oriented with the second cavity 96 to form a mold with a proper shape.

Preferably, in order to maintain accurate and secure alignment between the first holder 12 and the second holder 14 when the molding device 10 is in a closed position, the first and second holders 12 and 14 have first and second holder alignment means 190 and 192. The holder alignment means 190 and 192 can take any form but preferably, the second holder alignment means 192 comprise a stud 196 protruding upwardly from the outer end of the second channel 66 as shown in FIG. 5. The first alignment means 190 preferably comprise an aperture 194 which mates with the stud 196. The stud 196 extends upwardly and perpendicular to the second channel 66 at the outer end of the second channel 66.

To operate the molding device 10, the first and second holders 12 and 14 are rotated about the hinge 32 until they form an open position as shown in FIG. 4. The first and second mold inserts 22 and 24 are inserted into first and second holders 12 and 14 by aligning the first narrow and wide openings 130 and 132 of the first insert 22 with the first narrow and wide hooks 124 and 126 of the first holder 12 and rotating the insert 22 in a clockwise position until it is secured.

Similarly, the second mold insert 24 is secured to the second holder 14 by aligning the second narrow and wide openings 140 and 142 with the second narrow and wide hooks 134 and 136 and rotating the second mold insert 24 in a clockwise position until it is secured.

Again referring to FIG. 5, molding compound is placed into the first cavity 94 of the first insert 22 and into the second cavity 96 of the second mold insert 24. If necessary, excess molding compound which extends substantially above the first and second mold faces 90 and 92 can be removed and the first and second handles 34 and 40 are rotated about the hinge 32 until the first and second mold inserts 22 and 24 are joined to form a mold.

Preferably, in order to assure a proper mold shape, the first narrow and wide hooks 124 and 126 and the second narrow and wide hooks 134 and 136 are so oriented relative to the hinge 32 that an identical mold can be formed regardless of which mold insert is placed into the first and second holders 12 and 14. Thus, the first and second mold inserts 22 and 24 are interchangeable.

Consequently, the molding device 10 can accept many different molds by providing a molding device 10 which utilizes first and second mold inserts 22 and 24 which can be assembled onto first and second holders 12 and 14. The molding device 10 which can accommodate a multitude of molds, is less bulky, is less expensive, and is able to be accommodated into a smaller package than molding devices which utilize dedicated molds for each object to be molded. The molding device 10 can be updated, modernized and expanded by the simple procurement of additional mold inserts 22 and 24. These additional inserts 22 and 24 would be much less expensive to manufacture than complete molding devices 10.

By utilizing mold inserts 22 and 24 and mold holders 12 and 14, a molding device 10 which can accommodate a multitude of molds can be manufactured with lower investment cost because smaller, less complicated and less expensive molding dies to manufacture the inserts 22 and 24 would be possible rather than larger more expensive dies for larger molding devices.

Misorientation of the molding inserts 22 and 24 is avoided by using narrow and wide openings which interact with narrow and wide hooks. Furthermore, the inserts 22 and 24 may be securely attached to the holders 12 and 14 by providing twist locks 154 and 156 in conjunction with projections 162 and 166 and detents or holes 160 and 164. In addition the inserts 22 and 24 may be accurately located by utilizing surfaces 100 and 102 on the inserts 22 and 24 which interact with rings 44 and 46 on the holders. Finally, by locating the handles 34 and 40 opposite the hinge 32, a mechanical advantage can be obtained when forming the mold in order that a accurate mold can be obtained by a small child.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A molding device for making molded items from molding compound comprising:

a first mold insert having a first angular alignment portion, said first mold insert defining at least one cavity for forming a first portion of the molded item;

a first mold insert holder to hold said first mold insert, said first mold insert holder having a surface to rotatably engage said first mold insert and a second angular alignment portion operatively engaging said first angular alignment portion for aligning said first mold insert with respect to said first mold insert holder when said first mold insert is rotated relative to said first mold insert holder, said first mold insert being removable from said first mold insert holder;

a second mold insert having a third alignment portion said second mold insert defining at least one cavity for forming a second portion of the molded item; and a second mold insert holder to hold said second mold insert, said second mold insert holder having a surface to rotatably engage said second mold insert and a fourth angular alignment portion operatively engaging said third angular alignment portion for aligning said second mold insert with respect to said second mold insert holder when said second mold insert is rotated relative to said second mold insert holder, said second mold insert being removable from said second mold insert holder, said first and second mold insert holders being operatively engaging such that said cavities of said first and second mold inserts align to form said molded item when said molding device is closed with said first and second mold inserts attached to said first and second mold insert holders.

2. The molding device as in claim 1 wherein said first mold insert holder is operatively connected to said second mold insert holder.

3. The molding device as in claim 2 wherein said said first and second mold insert holders are operatively connected by a living hinge and said first mold insert holder, said second mold insert holder and said hinge are integral.

4. The molding device as in claim 1 wherein said first mold insert holder further comprises a first handle means and wherein said second mold insert holder further comprises a second handle means, wherein said first and second handle means are used for squeezing said first and second mold insert holders together.

5. The molding device as in claim 1 wherein said first angular alignment portion comprises a first opening and a second opening in said first mold insert, said second angular alignment portion comprises a first hook and a second hook for engaging said first mold insert by passing said first and second hooks of said first mold insert holder through said first and second openings in said first mold insert and rotating said first mold insert with respect to said first mold insert holder, said first hook of said first mold insert holder being wider than said second opening of said first mold insert, said third angular alignment portion comprises a first opening and a second opening in said second mold insert, and said fourth angular alignment portion comprises a first hook and a second hook for engaging said second mold insert by passing said first and second hooks of said second mold insert holder through said first and second openings in said second mold insert and rotating said second mold insert with respect to said second mold insert holder, said first hook of said second mold insert holder being wider than said second opening of said second mold insert.

6. The molding device as in claim 1 wherein said first angular alignment portion includes an opening on a portion of said first mold insert, said second angular alignment portion includes a hook for engaging said first angular alignment portion, said third angular alignment portion includes an opening on a portion of said first mold insert and said fourth angular alignment portion includes a hook for engaging said third angular alignment portion.

7. A molding device for making molded items from modeling compound comprising:

a first mold insert having a first angular alignment portion, said first mold insert defining at least one cavity for forming a first portion of the molded item;

a first mold insert holder to hold said first mold insert, said first mold insert holder having a surface to rotatably engage said first mold insert and a second angular alignment portion operatively engaging said first angular alignment portion for aligning said first mold insert with respect to said first mold insert holder when said first mold insert is rotated relative to said first mold insert holder, said first mold insert being removable from said first mold insert holder, said first mold insert holder having a first end and a second end, said second end having a first handle means;

a second mold insert having a third alignment portion, said second mold insert defining at least one cavity for forming a second portion of the molded item;

a second mold insert holder to hold said second mold insert holder having a surface to rotatably engage said second mold insert and a fourth alignment portion operatively engaging said third angular alignment portion for aligning said second mold insert with respect to said second mold insert holder when said second mold insert is rotated relative to said second mold insert holder, said second mold insert being removable from said second mold insert holder, said second mold insert holder having a first end and a second end, said second end having a second handle means; and hinge means operably connecting said first mold insert holder to said second mold insert holder wherein said cavities of said first and second mold inserts align to form said molded item when said molding device is closed with said first and second mold inserts attached to said first and second mold insert holders.

8. The molding device as in claim 7 wherein said hinge means is a living hinge.

9. The molding device as in claim 7 wherein said angular alignment portions include hooks and flanges on said holders and said inserts.

10. The molding device as in claim 7 wherein said second and fourth angular alignment portions of said first and second mold insert holders each comprise first and second hooks, and said first and third angular alignment portions of said first and second mold inserts each include flanges disposed adjacent first and second openings for engaging said first and second hooks.

11. The molding device as in claim 10 wherein said flanges of said first and second mold inserts each include a projection and said first and second hooks of said first and second mold inserts each include a detent for matingly engaging one of said projections on said flanges to lock said first and second mold inserts in first and second operating positions.

12. The molding device as in claim 10 wherein said second and fourth angular alignment portions include holder radial stops located on each of said first and second mold insert holders and said first and third angular alignment portions include insert radial stops located on each of said first and second mold inserts.

13. The molding device as in claim 7 wherein said handle means includes holder aligning means for aligning said first and second handle means.

14. The molding device as in claim 13 wherein said holder aligning means comprise a stud on said first handle means and an aperture on said second handle means, said stud matingly fitted to said aperture.

15. The molding device as in claim 7 further comprising centering means for centering said first and second mold inserts to said first and second mold insert holders.

16. The molding device as in claim 15 wherein said centering means comprise internal insert peripheries on said first and second mold inserts and external holder peripheries on said first and second mold insert holders, said internal insert peripheries matingly fitted to said external holder peripheries.

17. The molding device as in claim 7 further comprising depth alignment means for proper depth alignment of said first and second mold inserts in said first and second mold insert holders.

18. The molding device as in claim 17 wherein said depth alignment means comprise a holder face on each of said first and second mold insert holders and an insert face on each of said first and second mold inserts, each of said holder faces matingly cooperating with one of said insert faces.

19. The molding device as in claim 7 wherein said first and second mold inserts are interchangeable.

20. The molding device as in claim 7 wherein said first angular alignment portion comprises a first opening and a second opening in said first mold insert, said second angular alignment portion comprises a first hook and a second hook for engaging said first mold insert by passing said first and second hooks of said first mold insert holder through said first and second openings in said first mold insert and rotating said first mold insert with respect to said first mold insert holder, said first hook of said first mold insert holder being wider than said second opening of said first mold insert, said third angular alignment portion comprises a first opening and a second opening in said second mold insert, and said fourth angular alignment portion comprises a first hook and a second hook for engaging said second mold insert by passing said first and second hooks of said second mold insert holder through said first and second openings in said second mold insert and rotating said second mold insert with respect to said second mold insert holder, said first hook of said second mold insert holder being wider than said second opening of said second mold insert.

21. The molding device as in claim 7 wherein said first angular alignment portion includes an opening on a portion of said first mold insert, said second angular alignment portion includes a hook for engaging said first angular alignment portion, said third angular alignment portion includes an opening on a portion of said first mold insert and said fourth angular alignment portion includes a hook for engaging said third angular alignment portion.

22. A molding device for making molded items from molding compound comprising:

a first mold insert having a perimeter, a first opening, and a second opening, said first and second openings being oppositely disposed on said perimeter of said first mold insert, said second opening being narrower than said first opening, said first mold insert defining at least one cavity for forming a first portion of the molded item;

a first mold insert holder having a first end to hold said first mold insert and a second end having a first handle, said first end of said first mold insert holder having a first hook and a second hook narrower than said first hook, said first and second hooks to secure said first mold insert to said first holder in a first operating position by passing said first and second hooks of said first mold insert holder through said first and second openings in said perimeter of said first mold insert and rotating said first mold insert with respect to said first mold insert holder, said first hook of said first mold insert holder being wider than said second opening of said first mold insert, said first handle having first aligning means;

a second mold insert having a perimeter, a first opening, and a second opening, said first and second openings being oppositely disposed on said perimeter of said second mold insert, said second opening being narrower than said first opening, said second mold insert defining at least one cavity for forming a second portion of the molded item;

a second mold insert holder having a first end to hold said second mold insert and a second end having a second handle, said second end of said second mold insert holder having a first hook and a second hook narrower than said first hook, said first and second hooks to secure said second mold insert to said second mold insert holder in a second operating position by passing said first and second hooks of said second mold insert holder through said first and second openings in said perimeter of said second mold insert and rotating said second mold insert with respect to said second mold insert holder, said first hook of said second mold insert holder being wider than said second opening of said second mold insert, said second handle having second aligning means for aligning said first and second handles; and a living hinge operably connecting said first end of said first mold insert holder to said first end of said second mold insert holder wherein said cavities of said first and second mold inserts align to form said molded item when said molding device is closed with said first and second mold inserts attached to said first and second mold insert holders in said first and second operating positions.

23. The molding device as in claim 22 wherein said first mold insert hold, said second mold insert holder, and said living hinge are integral.

24. The molding device as in claim 22 wherein said first and second mold inserts include flanges disposed adjacent said first and second openings for engaging said first and second hooks on said first and second mold insert holders.

25. The molding device as in claim 22 wherein said first and second aligning means comprise a stud on said first handle and an aperture on said second handle, said stud matingly fitted to said aperture.

26. A mold insert holding device in combination with a first mold insert and a second mold insert for making molded items from modeling compound, said first mold insert having a perimeter, a first opening, and a second opening, said first and second openings being oppositely disposed on said perimeter of said first mold insert, said first mold insert defining at least one cavity for forming a first portion of said molded item, said second mold insert having a perimeter, a first opening, and a second opening, said first and second openings being oppositely disposed on said perimeter of said second mold insert, said second mold insert defining at least one cavity for forming a second portion of the molded item, said mold insert holding device comprising:

a first mold insert holder to hold said first mold insert in a first operating position, said first mold insert holder having a first hook and a second hook to engage said first mold insert by passing said first and second hooks of said first mold insert holder through said first and second openings in said perimeter of said first mold insert and rotating said first mold insert with respect to said first mold insert holder, said first hook of said first mold insert holder being wider than said second opening of said first mold insert, wherein said first mold insert is removable from said first mold insert holder; and a second mold insert holder to hold said second mold insert in a second operating position, said second mold insert holder having a first hook and a second hook to engage said second mold insert by passing said first and second hooks of said second mold insert holder through said first and second openings in said perimeter of said second mold insert and rotating said second mold insert with respect to said second mold insert holder, said first hook of said second mold insert holder being wider than said second opening of said second mold insert, wherein said second mold insert is removable from said second mold insert holder and said cavities of said first and second mold inserts align to form said molded item when said first and second mold insert holders operatively engage with said first and second mold inserts attached to said first and second mold insert holders in said first and second operating positions.

27. A molding device for making molded items from molding compound comprising:

a first mold insert having a perimeter, a first opening, and a second opening, said first and second openings being oppositely disposed on said perimeter of said first mold insert, said second opening being narrower than said first opening, said first mold insert defining at least one cavity for forming a first portion of the molded item;

a first mold insert holder to hold said first mold insert in a first operating position, said first mold insert holder having a first hook and a second hook for engaging said first mold insert by passing said first and second hooks of said first mold insert holder through said first and second openings in said perimeter of said first mold insert and rotating said first mold insert with respect to said first mold insert holder, said first hook of said first mold insert holder being wider than said second opening of said first mold insert, said first mold insert being removable from said first insert holder;

a second mold insert having a perimeter, a first opening, and a second opening, said first and second openings being oppositely disposed on said perimeter of said second mold insert, said second opening being narrower than said first opening, said second mold insert defining at least one cavity for forming a second portion of the molded item; and a second mold insert holder to hold said second mold insert in a second operating position, said second mold insert holder having a first hook and a second hook for engaging said second mold insert by passing said first and second hooks of said second mold insert holder through said first and second openings in said perimeter of said second mold insert and rotating said second mold insert with respect to said second mold insert holder, said first hook of said second mold insert holder being wider than said second opening of said second mold insert, said second mold insert being removable from said second insert holder, said first and second holders operatively engaging such that said cavities of said first and second mold inserts align to form said molded item when said molding device is closed with said first and second mold inserts attached to said first and second mold insert holders in said first and second operating positions.

* * * * *